(12) United States Patent
Henriksson

(10) Patent No.: US 9,021,239 B2
(45) Date of Patent: Apr. 28, 2015

(54) IMPLEMENTATION OF MULTI-TASKING ON A DIGITAL SIGNAL PROCESSOR WITH A HARDWARE STACK

(75) Inventor: Tomas Henriksson, Eindhoven (NL)

(73) Assignee: NXP, B.V., Eindhoven (NL)

( * ) Notice: Subject to any disclaimer, the term of this patent is extended or adjusted under 35 U.S.C. 154(b) by 1758 days.

(21) Appl. No.: 11/911,873

(22) PCT Filed: Apr. 7, 2006

(86) PCT No.: PCT/IB2006/051075
§ 371 (c)(1),
(2), (4) Date: Oct. 3, 2008

(87) PCT Pub. No.: WO2006/111881
PCT Pub. Date: Oct. 26, 2006

(65) Prior Publication Data
US 2009/0083754 A1    Mar. 26, 2009

(30) Foreign Application Priority Data
Apr. 22, 2005    (EP) .................................... 05103296

(51) Int. Cl.
| G06F 15/00 | (2006.01) |
| G06F 7/38 | (2006.01) |
| G06F 9/00 | (2006.01) |
| G06F 9/44 | (2006.01) |
| G06F 9/48 | (2006.01) |
| G06F 9/38 | (2006.01) |

(52) U.S. Cl.
CPC ............ G06F 9/4843 (2013.01); G06F 9/3851 (2013.01); G06F 9/4426 (2013.01)

(58) Field of Classification Search
None
See application file for complete search history.

(56) References Cited

U.S. PATENT DOCUMENTS

| 5,428,779 | A | 6/1995 | Allegrucci et al. |
| 5,613,114 | A | 3/1997 | Anderson et al. |
| 5,946,489 | A * | 8/1999 | Yellin et al. .................... 717/147 |
| 6,061,711 | A | 5/2000 | Song et al. |
| 6,085,233 | A * | 7/2000 | Jeffrey et al. ................ 709/216 |
| 6,314,513 | B1 * | 11/2001 | Ross et al. .................... 712/228 |
| 6,823,517 | B1 | 11/2004 | Kalman |
| 2004/0098552 | A1 | 5/2004 | Kadi |
| 2004/0199916 | A1 | 10/2004 | Joffe et al. |

OTHER PUBLICATIONS

Dunkels et al., Protothreads, Mar. 2005, pp. 1-25.*
Martin M M et al: "Exploiting Dead Value Information" Proceedings of the 30th Annual EEE/ACM Internation Symposium on Microarchitecture. Micro-30. Research Traingle Park, NC, Dec. 1-3, 1997, Proceedings of the Annual International Symposium on Microarchitec True, Los Alamitos, CA: IEEE Computer SO, vol. 30th Conf, December 1, 1997, p. 125-135, XP010261290, ISBN: 0-8186-7977-8 The Whole Document.

* cited by examiner

*Primary Examiner* — George Giroux

(57) ABSTRACT

The disclosure relates to the implementation of multi-tasking on a digital signal processor. Blocking functions are arranged such that they do not make use of a processor's hardware stack. Respective function calls are replaced with a piece of inline assembly code, which instead performs a branch to the correct routine for carrying out said function. If a blocking condition of the blocking function is encountered, a task switch can be done to resume another task. Whilst the hardware stack is not used when a task switch might have to occur, mixed-up contents of the hardware stack among function calls performed by different tasks are avoided.

15 Claims, 1 Drawing Sheet

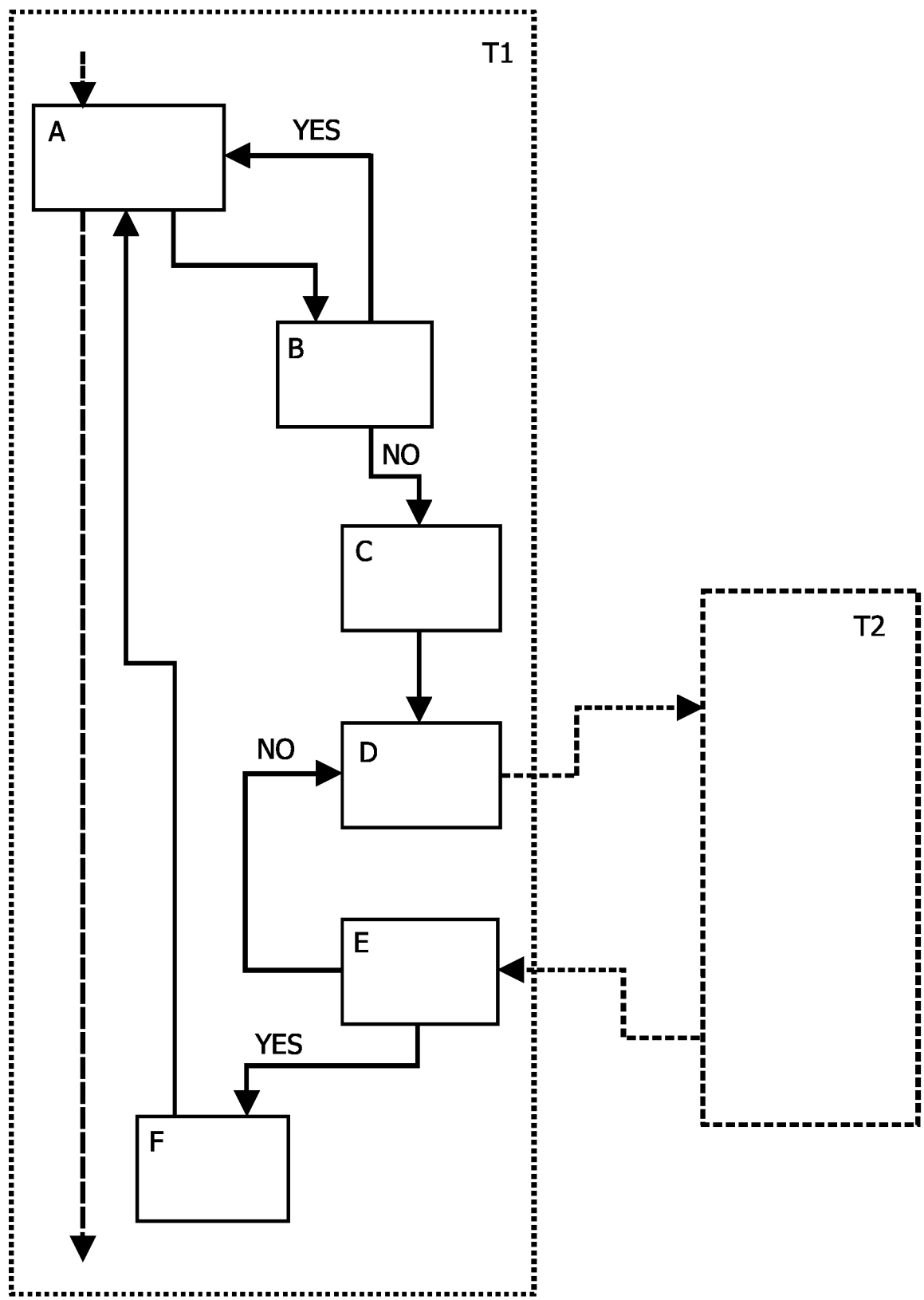

IMPLEMENTATION OF MULTI-TASKING ON A DIGITAL SIGNAL PROCESSOR WITH A HARDWARE STACK

The present invention relates to a method for implementing multi-tasking on a digital signal processor with a hardware stack, a computer program product, a computer system, and a data carrier as described herein.

Nowadays, multi-media applications are more and more implemented in consumer products having a hardware environment comprising multiple processors. As part of such multiple processors, one or more digital signal processors (DSPs) are often used to accelerate computationally intensive tasks. Traditionally, DSPs are suited for executing one single program. This was adequate for static applications, which can be easily described in one single program. However, new algorithms are dynamic in behaviour, e.g. data-dependent, and therefore applications are developed as a graph of communicating tasks. Tasks must be easy to design and to integrate in order to achieve sufficiently high design productivity.

For data exchange, tasks communicate with each other through special functions for inter-task communication. For instance, such functions may provide a mechanism to read and write data from/to a first-in-first-out (FIFO) buffer. To do that, two basic kinds of operations are needed for a) synchronization and b) data transfer. Synchronization operations check if enough data or room, respectively, is available in a buffer and where applicable, signal that new data or room, respectively, has become available. Data transfer operations move data to/from the buffer. The operations may be combined into functions in various ways.

The semantics of the synchronization operations can be of different kind. Basically, the synchronization operations that check for data or room, respectively, may be logically blocking until data or room, respectively, is available. However, for better usage of the processor hardware, if required data or room is not available for a task, another task should get the opportunity to execute. Thus, functions, which implement synchronization operations, which check for availability of data or room may directly return a true/false value to the task. If the return value is false, a task switch is needed. This is called non-blocking synchronization.

As a first approach, applications may comprise tasks that use non-blocking synchronization for inter-task communication which pass back control to a task scheduler by returning from the task if the non-blocking synchronization function returns a false value, i.e. signalling that, for instance, data or room, respectively, is not available. However, this results in a complex code structure for tasks with data dependent communication behaviour because the point of execution must be recomputed next time the task is scheduled.

According to a second approach blocking synchronization functions are used, the code structure is simplified because the task logically waits until the synchronization function call returns. A simpler code structure means that the task is easier to design and thereby the design productivity increases by using blocking synchronization. Now the problem is to implement the blocking synchronization functions, because when a function call blocks, a task switch must occur to avoid deadlocks as well as to make efficient use of the DSP. Further, actual DSPs do not support task switches. Furthermore, actual DSPs often comprise a hardware stacks to decrease the overhead of function calls. However, the use of the hardware stack, which is not visible to the software, hinders software controlled task switches on blocking function calls. This problem is explained in more detail in the following.

The hardware stack is used when a function call is executed, which, for instance, corresponds in common assembly instruction sets (AIS) to the assembly instruction GOSUB. Before the first instruction of a called function begins to execute, the current value of the program counter (PC) is pushed on the hardware stack. Additionally, in case the stack is build up in an upward direction in the respective stack register segment of the processor, the hardware stack pointer is incremented, accordingly. Only now, the address of the first instruction of the called function is copied to the PC and the code of the called function can be fetched and begin to execute. After execution, the called function returns, this, for instance, corresponds in common AIS to the assembly instruction RTS. Then, the stack pointer is decremented, accordingly, and the value of the program counter before the function call is popped from the hardware stack, i.e. is copied to the PC. Subsequently, the calling code continues to execute after the function call. In case of a task switch due to blocking of the called function, the contents of the hardware stack may be mixed up among several tasks.

In the following, an example scenario with two tasks A and B is used to illustrate this problem. At the beginning, task A is assumed being executed and the hardware stack being empty. Accordingly, the stack pointer is 0. Now, task A calls a function f1, which causes the return address of task A to be pushed to the hardware stack at position 0 and the stack pointer to be incremented to 1. Now, due to some reason the called function f1 blocks. Then, a task switch to task B is made, to give task B the opportunity to execute. During execution of task B, a function f2 is called, which causes the return address of task B to be pushed to the hardware stack at position 1 and accordingly, the stack pointer is incremented to 2. Due to some reason called function f2 is also blocked and therefore, a task switch back to task A is made. Now it is assumed that function f1 is no longer blocking and therefore, executed. After execution, function f1 returns, i.e. the value at stack position 2 is copied to the PC. However, the value at stack position 2 is the return address of task B not of task A. This is obviously wrong, because function f1 was called from task A.

As a result, it has been shown that task switching is not independent of the DSP's hardware stack. In general-purpose processors, the described problem does not exist since multiple tasks are typically executed with blocking functions and there are no hardware stacks. However, in DSPs, which often have hardware stacks, task switching is problematic as described above.

It is therefore, an object of the present invention to provide a method by which task switching is possible without problems with the data consistency of the hardware stack. In particular, it is an object of the invention to provide task switching on a digital signal processor (DSP).

All or particular objectives of the invention are solved by a method as presented herein. Accordingly, a method for implementing multi-tasking on a digital signal processor with a hardware stack by blocking synchronization functions, said method comprising the steps: storing a respective return address of a first task and branching to code for carrying out a blocking function; determining if a blocking condition for said blocking function is present; in case of a blocking condition storing shared resources of the processor; and switching to at least a second task.

The general inventive idea of the invention resides in implementing of the blocking functions so that they do not make use of the hardware stack. In other words, respective function calls are modified with a piece of inline assembly code, which, basically, saves the program counter and jumps to the correct routine for carrying out said function, i.e. since a branch instruction is used instead of a calling a subroutine the hardware stack is not used by the processor. Now, if a blocking condition is encountered, advantageously, a task switch can be done to resume another task. Whilst the hardware stack is not used when a task switch might have to occur, the afore-described problem of mixed-up contents of the hardware stack among function calls performed by different task is overcome by the method according to the present invention.

By further comprising the step of re-checking said blocking condition after switching back from said at least second task and switching to said at least second task if said blocking condition is still present, advantageously, the method of the invention provides a autonomous task switch interface in said first task, and any task in which the method is implemented, by means of a loop comprising said task-switching and re-checking. If said first task is still blocked by said blocking condition of said blocking function another task switch to another task will be made. If said blocking condition is no longer present, said shared resources of said first task are restored. Then, it is branched to said return address of said first task and execution of said first task is continued.

If in said determining step it is determined that said blocking condition is not present, it is branched to said return address of said first task and execution of said first task is continued.

In the DSP, there is a scheduler for scheduling multiple tasks. Said scheduler may administrate multiple tasks, for instance, by means of a ready queue. Said multiple tasks may communicate with each other, i.e. exchange common used and/or processed data, through special functions for inter-task communication. Thus, efficiency of an application which is composed of said multiple tasks can be enhanced by task-switching among said multiple tasks when run on a computer system having a digital signal processor with hardware stack.

The method according to the present invention can be part of or advantageously used in a computer program product comprising code means, which can be run on a computer system having at least a processor with a hardware stack invisible to said code means. Thus, by the use of the blocking synchronization of blocking functions according to the invention, task switching can easily be used in such computer programs. Accordingly, the present invention can be used in a computer system having a processor with a hardware stack invisible to code means running on said computer system and a memory, which processor is able to execute code means stored in said memory. Finally, yet importantly, a data carrier may contain such code means which are arranged to make use of a method according to the present invention when run on a computer system having a processor with a hardware stack invisible to code means running on said computer system such that said computer system can process multiple tasks by means of task switching between said multiple tasks.

The invention will be more completely understood in consideration of the following detailed description of an embodiment of the invention in connection with the accompanying drawing, in which:

FIG. 1 shows a flow diagram illustration the implementation of task switching according to the invention.

According to the preferred embodiment of the invention, the invented method is implemented by means of several types of code segments. While the invention is amendable to various modifications and alternative forms, a specific example thereof will be shown. However, it is noted that for sake of general validity, pseudo code is used for illustration of the embodiment. The embodiment shows how according to the invention multi-tasking can be implemented on a processor that normally uses a hardware stack, which is invisible to the software alike a DSP. Whilst the invention makes use of several code segments for implementation of blocking functions, it should be understood that the intention is not to limit the invention to the particular embodiment described. On the contrary, the intention is to cover all modifications, equivalents, and alternatives falling within the scope of the invention as defined by the appended claims. Above all, it is to be noted that the given example for a blocking function is a synchronization function which checks on availability of data.

In the following code segments for implementation of the invention on a DSP will be introduced. First of all, in the code of a current task "Current_task" an inline assembly code segment is used instead of a function call for such predetermined functions, which may block on a blocking condition, which may cause a task switch. To the inline assembly code reference is made herein as type A, or in short code A:

```
"Temp_pc = PC+2;
GOTO Check_data_available;
Continue;"
```

The code A is a piece of inline assembly code by which, a branch is made to the respective function code instead of calling the function. Thus, it goes without saying that there is a separate code type A for every respective predetermined blocking function, i.e. any function that may block and on whose blocking a switch to another task shall be made. The variable "Temp_pc" is used as a temporal program counter, whose value (PC+2) points to the location of the "Continue" instruction and thus will be used for a jump back to the calling code such that execution of the calling code can be continued. In this connection, it is worth noting that the inventor has found that it is advantageous to disable interrupts during the execution of the instruction "Temp_pc=PC+2". Interrupts can be enabled again after setting the variable "Temp_pc". The instruction "GOTO Check_data_available" is the jump to code named "Check_data_available", which is the actual code of the (originally called) function and will be explained as next.

The code "Check_data_available" is the code that executes the function, which according to the prior art would have been called. To the "Check_data_available" code reference is made herein as code of type B, or in short code B:

```
"Check_data_available:
If (enough tokens)
    GOTO Temp_pc;
Else
    GOSUB Save_state;
    Current_task->return_point = Re_check_data_available;
    GOTO Task_switch;"
```

Basically, by execution of the code B it is determined whether a blocking condition is encountered or not. If not, execution proceeds by jumping back to where "Temp_pc" is pointing to, else a task switch is prepared by calling the "Save_state" code which is explained next and setting a variable "Current_task->return_point" such that it points to a respective "Re_check_data_available" code, which is explained further below. It is again noted that there is also separate code B for every respective possible blocking function, which may initiate a task switch to another task.

As to the code "Save_state", which is for saving the state of all registers in memory. To the code "Save_state" reference is made as code of type C, or in short code C:

```
"Save_state:
Save all registers in memory;
Return;"
```

Code C is the state saving code, which saves the content of the shared resources of the processor, as a first step in preparation of switching to another task, which is controlled by the following code "Task_switch".

The code "Task_switch" provides a kind of interface for synchronized task switching among stalled tasks caused by predetermined blocking functions. To the code "Task_switch" reference is made as code of type D, or in short code D:

```
"Task_switch:
Current_task->parameters = parameters;
Current_task = scheduler_get_next_task;
Parameters = Current_task->parameters;
GOTO Current_task->return_point;"
```

Basically, code D is the task switching code, which gives control to another task, e.g. the next task in the ready queue administered by a scheduler. Before a task switch, the actual parameters of the "Current_task" are stored as "Current_task->parameters". It is to be noted that the parameters include also the respective value of Temp_pc. Then, the "Current_task" can be changed to another task. The parameters of another task, i.e. a new "Current_task", are restored from respective "Current_task->parameters". Next, a jump is made to the respective "Current_task->return_point". As described above for the "Current_task" the variable "Current_task->return_point" has been set to the address of "Re_check_data_available", which will be explained next.

The code "Re_check_data_available" for re-checking on the blocking condition of the blocking function, i.e. in this embodiment the function "Check_data_available". To the code "Re_check_data_available" reference is made as code of type E, or in short code E:

```
"Re_check_data_available:
If (enough tokens)
    GOSUB Restore_state;
    GOTO Temp_pc;
Else
    GOTO Task_switch;"
```

That is, code E is the code that re-checks the blocking condition of the respective blocking function of the respective "Current_task" after a task switch back has occurred. Basically, it has the same characteristics as the respective code B. If the blocking condition is no longer present, then a code "Restore_state", which is described next, is called and the originally task continues to execute which is initiated by the jump to the location to which "Temp_pc" is pointing to, i.e. the "Continue" instruction in the code of type A. If the blocking condition is still present, then there is a jump back to the code D, i.e. "Task_switch", and again another task can be made active. Thus, both codes D and E constitute a cycle between task switching and re-checking on the blocking reason in the respective "Current_task".

The code "Restore_state" is for restoring the state of all registers from the memory. To code "Restore_state" reference is made as code of type F, or in short code F:

```
"Restore_state:
Restore all registers from memory;
Return;"
```

Code F is the state restoring code, which restores the contents of the shared resources of the processor.

It is noted that the codes C, D, and F according to the invention may be shared between all predetermined blocking functions, i.e. may generally be the same. Only the codes A, B, and E may be more or less individually adapted to the respective blocking function.

In the following, execution of the above discussed codes A, B, C, D, E, and F is described in connection with the flow diagram of FIG. 1. When in a "Current_task" T1 a code A is executed, the temporal program counter "Temp_pc" set by the value of the program counter PC incremented by 2. Then, a jump to the corresponding code B is done. The outcome of the code B can be either that a) no blocking condition was encountered, which means YES in FIG. 1; or that b) a blocking condition was encountered, which means NO in FIG. 1.

In the case of a) a jump is done back to the end of the code A, to where the temporal program counter "Temp_pc" is pointing to and the task continues, i.e. the original called function executes. In the case of b), the code C is executed and thus all the relevant values of the current task T1, i.e. the content of the shared resources of the processor, are saved to the memory. Then, a jump to the code D is done. The code D stores also information about the reason for the task switch. It is worth to be noted that also the value of "Temp_pc" belongs to the parameters, which are stored in the variable "Current_task->parameters". After that, the code D fetches another task T2 from the ready list and makes it the new "Current_task". After a switch back from the other task T2 or tasks, the code D jumps to the "Current_task->return point", which is a code E and in the present embodiment is the function "re_check_data_available", i.e. is based on the reason for the first task switch away from the original "Current_task" T1 to another task T2.

The code E executes similar code as that of the code B. Again there are two outcomes possible, either c) the blocking condition is no longer present, which means YES in FIG. 1; or d) the blocking condition is still present, which means NO in FIG. 1. In the case of c), the code of type F is called, which restores the shared resources, i.e. the processor registers, from the memory and then, a jump is made back to the end of the original code A in the original "Current_task", i.e. the location represented by the value of "Temp_pc". The original "Current_task" can be continued. In the case of d), a jump to the code D is done for another task switch. In that case no shared resources need to be restored, because these values are already saved in the variable "Current_task->parameters".

The present invention has disclosed a method for implementing multi-tasking on a digital signal processor. For that purpose, blocking functions are arranged such that they do not make use of a processor's hardware stack. Respective function calls are replaced with a piece of inline assembly code, which instead performs a branch to the correct routine for carrying out said function. If a blocking condition of the blocking function is encountered, a task switch can be done to resume another task. Whilst the hardware stack is not used when a task switch might have to occur, mixed-up contents of the hardware stack among function calls performed by different task is avoided.

In general, the method of the present invention which enables multi-tasking on a digital signal processor with hardware stack, is general applicable to any processor that makes use of a hardware stack, which is not visible to the software, in case of function calls. By implementation of the method according to the invention task-switching is possible on such processors as DSPs, for example, the processor Epics7b from Philips Semiconductors. It is still worth to be noted that in order to make sure that the hardware stack has the same content when a task is switched out and when it is switched in again, blocking calls may only be used in the main function of the tasks.

The invention claimed is:

1. Method for implementing multi-tasking on a digital signal processor (DSP) with a hardware stack that is configured to be used by program code for call subroutines for which the hardware stack is invisible to a software program language used to program the DSP, said method comprising:
providing a set of DSP instructions including a primary set of instruction codes via the software program language and including inline assembly instruction codes,
wherein the inline assembly instruction codes, when executed by the DSP, cause the DSP to perform the following steps: storing a respective return address of a first task by saving a program counter for the digital signal processor and, instead of using the hardware stack of the DSP, branching to a different portion of the primary set of instruction codes for carrying out a blocking function, and including maintaining the hardware stack so contents of the stack remain unmodified; determining if a blocking condition for said blocking function is present; storing shared resources of the processor, if a blocking condition is determined; switching to at least a second task; and using the saved program counter to return to the first task.

2. Method according to claim 1, further comprising: re-checking said blocking condition after switching back from said at least second task and, if said blocking condition is still present, switching to said at least second task.

3. Method according to claim 2, further comprising: if said blocking condition is no longer present, restoring said shared resources and, branching to said return address of said first task and continuing execution of said first task.

4. Method according to claim 1, further comprising in said determining step, if said blocking condition is not present, branching to said return address of said first task and continuing execution of said first task.

5. Computer program product comprising a non-transitory medium and code, which is arranged at least in part on the non-transitory medium to perform a method according to claim 1 for blocking synchronization of blocking functions in task switching, when run on a computer system having at least a processor with a hardware stack invisible to said code.

6. Computer system having a non-transitory medium and a processor with a hardware stack invisible to code running on said computer system and a memory, which processor is able to execute code stored in said memory, wherein said code comprises multiple tasks and is arranged to perform a method according to claim 1 for blocking synchronisation of blocking functions used in said multiple tasks.

7. Method according to claim 1, wherein the contents of the hardware stack prior to the branching to the different portion of the primary set of instruction codes for carrying out the blocking function are equal to the contents of the hardware stack following the branching to the different portion of the primary set of instruction codes for carrying out the blocking function.

8. Method according to claim 1, wherein the storing shared resources of the processor includes saving the state of registers of the DSP in memory.

9. Method according to claim 1, further comprising: in response to the blocking condition for the at least one subroutine being unsatisfied, branching to the respective return address of the first task.

10. Method according to claim 1, further comprising: in response to encountering a blocking condition in the execution of the second task, performing the task switching to resume execution of the first task.

11. Method according to claim 1, further comprising: providing said at least one subroutine as part of a set of DSP instructions that includes inline assembly codes.

12. A method for implementing multi-tasking on a digital signal processor (DSP) having a hardware stack configured to be used by program code for call subroutines, in which the hardware stack is invisible to a software program language used to program the DSP, said method comprising:
executing a first task of the program code on the DSP;
during the execution of the first task of the program code,
storing a return address of the first task, and
branching to a subroutine for carrying out a blocking function while maintaining the hardware stack so contents of the stack remain unmodified;
in response to a blocking condition for the at least one subroutine being satisfied, causing the DSP to perform a task switch to initiate execution of a second task; and
using the return address to task switch to resume execution of the first task.

13. Method according to claim 12, further comprising, after task switching to resume execution of the first task:
in response to the blocking condition for the at least one subroutine being unsatisfied, branching to the return address of the first task; and
in response to the blocking condition for the at least one subroutine being satisfied, task switching to execute a task that is different from the first task.

14. Method according to claim 12, further comprising, in response to a blocking condition for the at least one subroutine being satisfied, storing values of shared resources of the DSP including a set of registers of the DSP.

15. Method according to claim 14, further comprising, if said blocking condition is no longer present after task switching to resume execution of the first task, restoring the shared resources to the stored values, branching to the return address, and continuing execution of the first task.

* * * * *